(12) United States Patent
Pyko et al.

(10) Patent No.: US 9,783,143 B2
(45) Date of Patent: Oct. 10, 2017

(54) CONTROL AND DIAGNOSTICS OF MULTIPLE ELECTRICAL GENERATING MACHINES USING AN EXTERNAL VOLTAGE REGULATOR

(71) Applicants: Jan S Pyko, Bloomfield Township, MI (US); Michael J Pawlukiewicz, Farmington Hills, MI (US); Michael E List, Grand Blanc, MI (US); Anson Lee, St. Clair, MI (US)

(72) Inventors: Jan S Pyko, Bloomfield Township, MI (US); Michael J Pawlukiewicz, Farmington Hills, MI (US); Michael E List, Grand Blanc, MI (US); Anson Lee, St. Clair, MI (US)

(73) Assignee: FCA US LLC, Auburn Hills, MI (US)

( * ) Notice: Subject to any disclaimer, the term of this patent is extended or adjusted under 35 U.S.C. 154(b) by 122 days.

(21) Appl. No.: 14/838,632

(22) Filed: Aug. 28, 2015

(65) Prior Publication Data

US 2015/0367792 A1 Dec. 24, 2015

Related U.S. Application Data

(62) Division of application No. 13/356,784, filed on Jan. 24, 2012, now Pat. No. 9,178,383.

(51) Int. Cl.
*H02J 1/00* (2006.01)
*H02J 3/00* (2006.01)
(Continued)

(52) U.S. Cl.
CPC ............... *B60R 16/03* (2013.01); *G05F 3/08* (2013.01); *H02J 1/10* (2013.01); *H02J 3/02* (2013.01);
(Continued)

(58) Field of Classification Search
CPC ...... H02H 7/06; H02J 7/14; H02J 3/38; H02J 4/00; H02J 9/00; B60L 1/00; H02M 5/45; H02P 9/48
(Continued)

(56) References Cited

U.S. PATENT DOCUMENTS 5,773,964 A 6/1998 Peter
7,782,023 B2 8/2010 Holguin
(Continued)

*Primary Examiner* — Rexford Barnie
*Assistant Examiner* — Jagdeep Dhillon
(74) *Attorney, Agent, or Firm* — Ralph E. Smith

(57) ABSTRACT

An electrical system for an automotive vehicle has a plurality of electrical generating machines having field windings energized by pulse width modulated drive signals generated by an external electronic voltage regulator. The pulse width modulated drive signals have a duty cycle determined by the electronic voltage regulator. A controller selects one of electrical generating machines to evaluate for failure and evaluates that electrical generating machine for failure by causing the PWM drive signal for the field windings of that electrical generating machine to be disabled. The controller then determines that this electrical generating machine has failed if the duty cycle for the PWM drive signals has then not been increased by the electronic voltage regulator by a pre-determined amount. The electrical generating machines are either generators or alternators. In an aspect, the PWM drive signals for the plurality of electrical generating machines are out of phase with each other.

4 Claims, 6 Drawing Sheets

(51) Int. Cl.
    *B60R 16/03*     (2006.01)
    *H02J 1/10*     (2006.01)
    *H02P 9/02*     (2006.01)
    *H02J 3/02*     (2006.01)
    *G05F 3/08*     (2006.01)
    *H02J 7/14*     (2006.01)

(52) U.S. Cl.
    CPC .......... *H02J 7/1423* (2013.01); *H02J 7/1461* (2013.01); *H02P 9/02* (2013.01); *H02J 7/14* (2013.01); *H02J 2007/143* (2013.01); *Y02E 10/763* (2013.01); *Y02T 10/7005* (2013.01)

(58) Field of Classification Search
    USPC ........ 307/80, 82, 23, 9.1, 10.1, 10.2, 22, 26, 307/84, 18; 322/28, 99, 90; 310/68 D, 310/68 R; 318/609, 599
    See application file for complete search history.

(56) References Cited

U.S. PATENT DOCUMENTS

| | | | |
|---|---|---|---|
| 7,956,584 B2 | 6/2011 | Peterson et al. | |
| 9,178,383 B2* | 11/2015 | Pyko | H02J 7/1423 |
| 2003/0075997 A1* | 4/2003 | Keim | B60L 11/1803 |
| | | | 310/68 D |
| 2004/0056627 A1* | 3/2004 | Grasso | H02M 7/53875 |
| | | | 318/609 |
| 2008/0084190 A1 | 4/2008 | Harmon et al. | |
| 2008/0084639 A1* | 4/2008 | Harmon | H02P 9/48 |
| | | | 361/20 |
| 2008/0088282 A1* | 4/2008 | Inokuchi | H02P 9/107 |
| | | | 322/28 |
| 2008/0157594 A1* | 7/2008 | Peterson | B60L 11/123 |
| | | | 307/10.1 |
| 2009/0146617 A1* | 6/2009 | Yoshida | H02K 11/20 |
| | | | 322/99 |
| 2009/0160248 A1* | 6/2009 | Ang | B60K 6/445 |
| | | | 307/9.1 |
| 2009/0167256 A1* | 7/2009 | Maddali | H02P 9/10 |
| | | | 322/25 |
| 2009/0243559 A1* | 10/2009 | Bartol | H02J 7/1423 |
| | | | 322/15 |
| 2010/0295516 A1* | 11/2010 | Matt | H02P 23/0077 |
| | | | 322/28 |
| 2011/0018504 A1* | 1/2011 | Patterson | H02P 9/302 |
| | | | 322/28 |
| 2011/0156664 A1* | 6/2011 | Horihata | H02P 9/48 |
| | | | 322/24 |
| 2011/0215641 A1* | 9/2011 | Peterson | H01H 11/00 |
| | | | 307/23 |
| 2012/0007568 A1* | 1/2012 | Horihata | H02J 7/1461 |
| | | | 322/21 |
| 2012/0081083 A1* | 4/2012 | Horihata | H02P 9/48 |
| | | | 322/99 |

* cited by examiner

CONTROL AND DIAGNOSTICS OF MULTIPLE ELECTRICAL GENERATING MACHINES USING AN EXTERNAL VOLTAGE REGULATOR

CROSS-REFERENCE TO RELATED APPLICATIONS

This application is a divisional of U.S. patent application Ser. No. 13/356,784 filed on Jan. 24, 2012. The entire disclosure of the above application is incorporated herein by reference.

FIELD

The present invention relates to the control and diagnostics of multiple electrical generating machines using an external voltage regulator.

BACKGROUND

In certain types of vehicles, such as medium and heavy duty trucks, it is advantageous to provide the electrical system with multiple electrical generating machines, which are alternators or generators depending on whether the electrical system uses alternators or generators. For convenience the discussion herein will be the context of alternators, it being understood that it also applies to generators.

A voltage regulator is used to regulate the output voltage of the alternator. Typically, the voltage regulator varies the voltage of the field of the alternator to regulate the output voltage of the alternator. In many applications, the alternator has an internal voltage regulator.

In certain applications having a single alternator, an external electronic voltage regulator has been used. In one such application, the external electronic voltage regulator is implemented in the electronic control unit (ECU) that is also used as the engine control module of a vehicle. In this application, the external voltage regulator outputs a pulse width modulated drive signal to the field winding of the alternator and varies field voltage of the alternator to regulate the output voltage of the alternator by varying the duty cycle of the pulse width modulated signal. As used herein, an "electronic voltage regulator" is a device that generates a pulse width modulated drive signal that is used to energize the field windings of an electrical generating machine. The device can be implemented in hardware or a combination of hardware and software. The device can be a stand-alone device or can be implemented as part of another device, such as the engine control module of a vehicle. The electronic voltage regulator can generate the pulse width modulated drive by directly generating it or generate it by controlling another device, such as a power switching device by generating a pulse width modulated switching signal that is used to switch the power switching device.

FIG. 1 is a basic schematic showing the topology of a prior art electrical system 100 in which an external electronic voltage regulator is used to control the voltage of an alternator. Electrical system 100 is illustratively an automotive vehicle electrical system and is a part of an automotive vehicle, shown representatively by dashed box 102 in FIG. 1. The external electronic voltage regulator is illustratively implemented in an electronic control unit ("ECU") 110, that is also the engine control module for vehicle 102. More specifically, electrical system 100 has an alternator 104, battery 106, power distribution center 108 and ECU 110 that is the engine control module. ECU 110 includes an electronic voltage regulator 112 that controls the field voltage of field windings 114 of alternator 104. A voltage output (B+) of alternator 104 is coupled through a fusible link 116 to a positive terminal 118 of battery 106. A negative terminal 120 of battery 106 is coupled to ground.

Electronic voltage regulator includes error signal generator 122, PI controller 124, PWM signal generator 126 and power signal driver 128, which is illustratively a high side driver and may be referred to herein as high side driver 128.

The control of alternator 104 is managed by the electronic voltage regulator 112 in ECU 110 based on voltage feedback sense line "B+ Sense" coupled to a "B+ sense" output of alternator 104, which is coupled to the internal voltage output of alternator 104 through a B+ resistor. This sense voltage is compared by error signal generator 122 to a target voltage determined by the ECU 110 based on various parameters known to the ECU 110 from other sensors in the electrical system 100 (not shown in FIG. 1), such as battery temperature, engine speed, engine load and others. The comparison between the sense voltage and the target voltage produces an error signal which is used by PI controller 124 of electronic voltage regulator 112 to calculate the duty cycle for a PWM drive signal applied to field windings 114 of alternator 104 to control the field voltage and thus regulate the output of alternator 104. The field windings 114 of alternator 104 are coupled to an output 130 of ECU 110 at which the PWM drive signal is generated. More specifically, PI controller 124 of electronic voltage regulator 112 determines the duty cycle at which to drive the field windings 114 of alternator 104 and outputs to PWM signal generator 126 the value of this duty cycle, which is the PWM value in FIG. 1. PWM signal generator 126 generates a PWM signal having this duty cycle which is used to switch high side driver 128, which turns on and off the field of alternator 104. High side driver 128 is coupled through contacts 132 of an automatic shutdown relay (ASD) 134 of power distribution center 108 and a fuse 136 of power distribution center 108 to positive terminal 118 of battery 106. High side driver 128 may illustratively be high power switching semiconductor device, such as an SCR, Thyristor, IGBT, power MOSFET, or the like. The objective of this control system is to minimize the error signal, which implies that the sense voltage is being controlled to achieve the target voltage. The PI loop in PI controller 124 of electronic voltage regulator 112 is calibrated to optimize the overshoot, undershoot and settling time performance specifications for system voltage response to various disturbances.

SUMMARY

In accordance with an aspect of the present disclosure, an electrical system for an automotive vehicle has a plurality of electrical generating machines. Each electrical generating machine includes field windings energized by pulse width modulated drive signals generated by an external electronic voltage regulator. The pulse width modulated drive signals have a duty cycle determined by the electronic voltage regulator. The electronic voltage regulator varies the duty cycle of the pulse width modulated drive signals to control output voltages of the electrical generating machines. A controller selects one of electrical generating machines to evaluate for failure. The controller evaluates that electrical generating machine for failure by causing the PWM drive signal for the field windings of that electrical generating machine to be disabled. The controller then determines that this electrical generating machine has failed if the duty cycle for the PWM drive signals has then not been increased by the electronic voltage regulator by a pre-determined amount after the PWM drive signal for the field windings of that electrical generating machine has been disabled. The electrical generating machines are either generators or alternators.

In an aspect, the controller evaluates in turn each of the electrical generating machines.

In an aspect, the PWM drive signals provided to each of the field windings of each of the electrical generating machines are out of phase with each other. In an aspect, the PWM drive signals are out of phase with each other a number of degrees determined by 360/X where X is the number of electrical generating machines that the electrical system has.

In an aspect, the field windings of each electrical generating machine are coupled to respective power signal drivers that are switched at the duty cycle to generate the PWM drive signals.

In an aspect, the controller is an engine control module and includes the electronic voltage regulator.

In an aspect, there is a separate electronic voltage regulator associated with each electrical generating machine that controls the duty cycle of the PWM drive signal provided to the field winding of that electrical generating machine. In an aspect, the engine control module includes each external voltage regulator.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 2A:
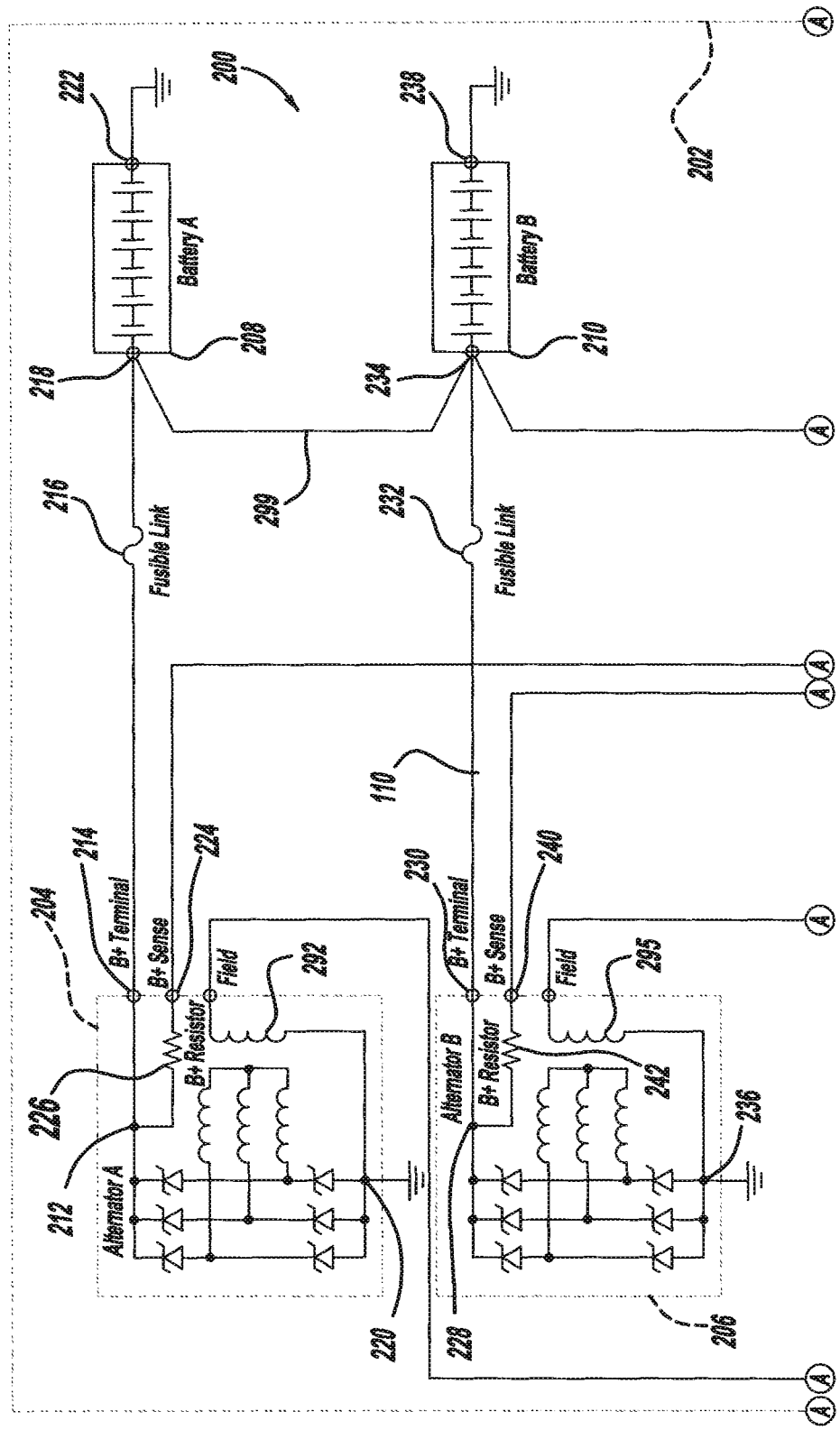
FIGS. 2A and 2B are a simplified schematic of a vehicle electrical system having multiple electrical generating machines having field windings energized by pulse width modulated drive signals controlled by an external electronic voltage regulator in accordance with an aspect of the present disclosure.
Figure 2B:
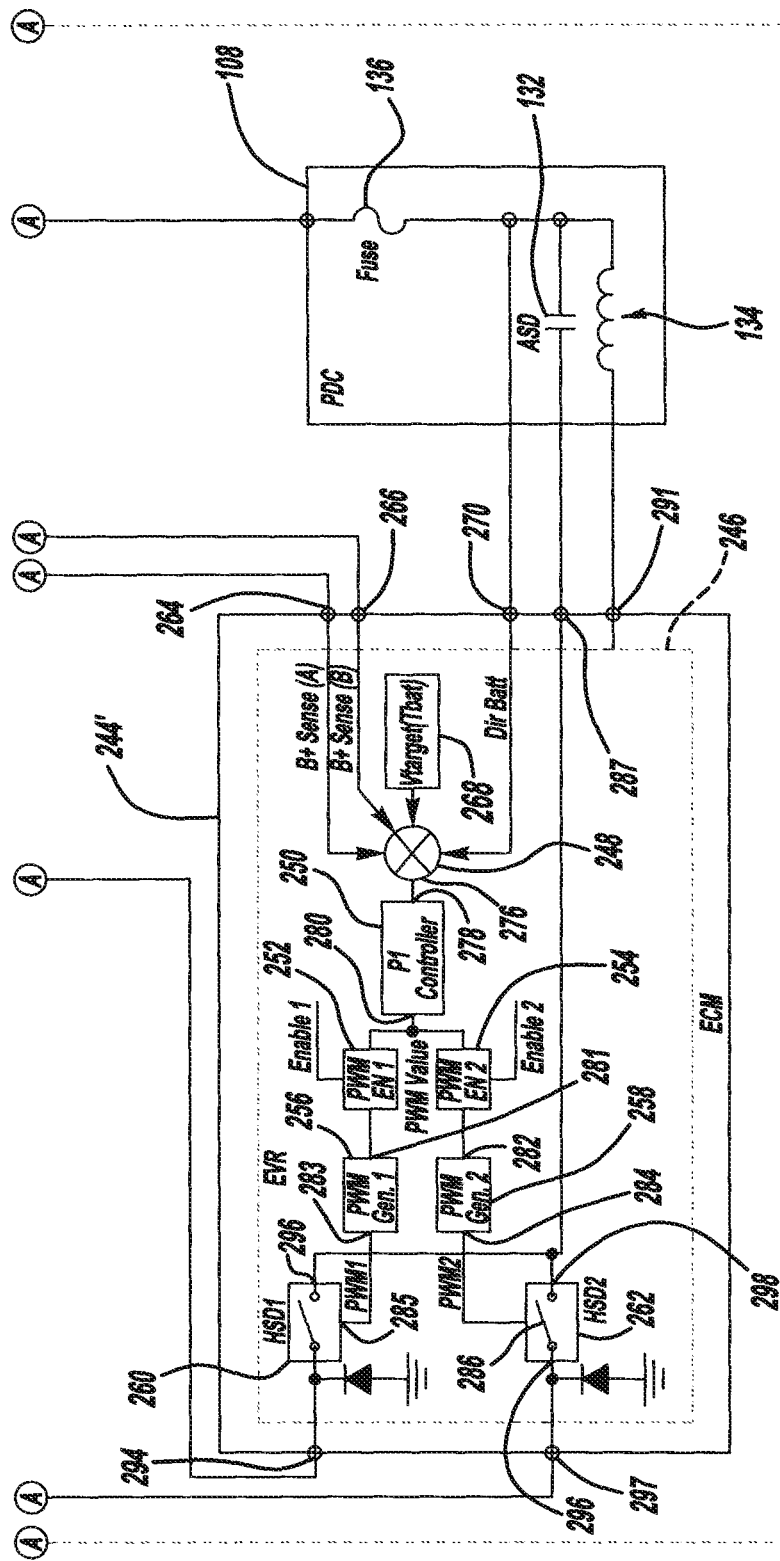

Referring to FIG. 2, an electrical system 200 having multiple electrical generating machines having fields controlled by external voltage regulators is shown. While the following will be described with reference to alternators, it should be understood that it also applies to generators. Electrical system 200 is illustratively an automotive vehicle electrical system and included in an automotive vehicle, shown representatively by dashed box 202 in FIG. 2.

Electrical system 200 is for use in vehicles where it is advantageous to have multiple alternators. In the illustrative example shown in FIG. 2, electrical system 200 has two alternators, Alternator A (also identified with reference numeral 204) and Alternator B (also identified with reference numeral 206). But it should be understood that electrical system 200 could have more than two alternators. In the illustrative example shown in FIG. 2, electrical system 200 also has two batteries, Battery A (also identified with reference numeral 208), and Battery B (also identified with reference numeral 210). But it should be understood that electrical system 200 could have other than two batteries. For example, if electrical system 200 has more than two alternators, it may have a corresponding number of batteries. It may also have a single battery.

Alternator A has an internal positive voltage output 212 coupled to a positive output voltage terminal 214 and a negative terminal 220 coupled to ground. Positive output voltage terminal 214 is coupled through fusible link 216 to a positive terminal 218 of battery A. A negative terminal 222 of battery A is also coupled to ground. Alternator A has a voltage sense output 224 coupled through a current limiting resistor 226 to an internal positive voltage output 212 of alternator A.

Alternator B has an internal positive voltage output 228 coupled to a positive output voltage terminal 230 and a negative terminal 236 coupled to ground. Positive output voltage terminal 230 is coupled through fusible link 232 to a positive terminal 234 of battery B. A negative terminal 238 of battery B is also coupled to ground. Alternator B has a voltage sense output 240 coupled through a current limiting resistor 242 to internal positive voltage output 228.

An electronic control unit ("ECU") 244 has an electronic voltage regulator 246 implemented therein. ECU 244 is illustratively an engine control module of vehicle 202. Electronic voltage regulator 246 includes error signal generator 248, PI controller 250, PWM enable 252 (for Alternator A), PWM enable 254 (for Alternator B), PWM signal generator 256 (for Alternator A), PWM signal generator 258 (for Alternator B), power signal driver 260 (for Alternator A), and power signal driver 262 (for Alternator B). ECU 244 also includes voltage sense inputs 264, 266 coupled to error signal generator 248, voltage target generator 268 coupled to error signal generator 248, and battery voltage input 270 coupled to error signal generator 248. Battery voltage input 270 is coupled through fuse 136 of power distribution center 108 to positive terminals 218, 234 of batteries A and B. Voltage sense input 264 is coupled to voltage sense output 224 of alternator A and voltage sense input 266 is coupled to voltage sense output 240 of alternator B.

Error signal generator 248 is illustratively implemented in software programmed in ECU 244 as is PI controller 250. PWM enables 252, 254 are also illustratively implemented in software programmed in ECU 244. Each PWM signal generator 256, 258 are also illustratively implemented in software programmed in ECU 244 and each generates a PWM signal having a duty cycle corresponding to a data value provided by PI controller 250 at data inputs 281, 282 of PWM signal generators 256, 258, respectively.

An output 276 of error signal generator 240 is coupled to an input 278 of PI controller 250. An output of 280 of PI controller 250 is coupled through PWM enables 256, 258 to data inputs 281, 282 of PWM signal generators 256, 258, respectively. An output 283 of PWM signal generator 256 is coupled to a control input 284 of power signal driver 260. An output 285 of PWM signal generator 258 is coupled to a control input 286 of power signal driver 262.

ECU 244 includes a power terminal 287 coupled through contacts 132 of automatic shutdown relay 134 of power distribution center 108 and through fuse 136 of power distribution center 108 to positive terminals 218, 234 of batteries A and B. Power inputs 296, 298 of power signal drivers 260, 262, respectively, are coupled to power terminal 287. One side of field windings 292 of alternator A is coupled to power output 294 of power signal driver 260 at output terminal 294 of ECU 244 (which is also coupled to power output 294 of power signal driver 260). The other side of field windings 292 is coupled to ground. One side of field winding 295 of alternator B is coupled to power output 296 of power signal driver 262 at output terminal 297 of ECU 244 (which is also coupled to power output 296 of power signal driver 262). The other side of field windings 295 is coupled to ground.

In an aspect, electronic voltage regulator 246 has the same basic elements as electronic voltage regulator 112. While electronic voltage regulator 246 is illustratively implemented in ECU 244, it should be understood that it could be implemented as a separate, stand-alone device.

Positive terminal 218 of battery A is coupled to positive terminal 234 of battery B by crossover line 299, which keeps the outputs of alternators A and B at a common level. It should be understood that if electrical system 200 has more than two alternators, the outputs of all the alternators are tied together to keep their outputs at a common level.

In electrical systems having multiple alternators, when the output of one of these alternators fails it is usually not readily apparent to the driver that the charging capability has been significantly reduced. Different strategies have been employed in the past to detect the lost output, all of which involve measuring the output voltage of the alternators under various operating scenarios.

In accordance with an aspect of the present disclosure, detection of the failure of an output of an alternator in an electrical system, such as electrical system 200, having multiple alternators is based on the response of the charging control system when the PWM drive signal to the field windings of one of the alternators is disabled (for example, set to have a zero percent duty cycle) and whether this response results in an increase in the duty cycle of the PWM drive signal. Illustratively, the duty cycle calculated by the PI controller 250 for the PWM drive signal is used in this. When all the alternators in the electrical system are functioning properly, temporarily disabling the PWM drive signal to the field windings of one of the alternators results in an increase in the duty cycle for the PWM drive signal calculated by PI controller 250. The PI controller 250 recognizes the reduction in current available from the alternators and compensates by increasing the duty cycle it calculates for the PWM drive signal. Failure of an alternator is detected when temporarily disabling the PWM drive signal to the field winding of that alternator does not result in an increase in the duty cycle calculated by the PI controller 250 for the PWM drive signal to the field windings of one or more of the other alternators.

With reference to the example electrical system 200 shown in FIG. 2, electronic voltage regulator 246 maintains a constant system voltage by controlling the duty cycle of the PWM drive signals applied to the field windings 292, 295 of the respective alternator A, B. When the field for an alternator A, B is off, the electrical current in electrical system 200 is maintained by the batteries A, B. As the system voltage begins to decrease, the field windings 292, 295 of alternators A, B are energized and the alternators A, B replace the lost charge of the batteries A, B and the system voltage is increased. Each voltage sense output 224, 240 provides an accurate measurement of the system voltage as it relates to each battery A, B. As the load on electrical system 200 changes, the target voltage (which is the desired system voltage) is adjusted based on the actual system voltage as measured by the ECU 244 and an error term is calculated based on the sense voltages at voltage sense inputs 264, 266 of ECU 244 and a target voltage determined by voltage target generator 268 of ECU 244. Illustratively, the voltage sense output 224 of alternator A is used by ECU 244 in calculating this error term unless alternator A has failed. If alternator A has failed, ECU 244 uses the voltage sense output 240 of alternator B to determine this error term. PI controller 250 then uses this error term to adjust the duty cycle it calculates for the PWM drive signal that is applied to the respective field windings 292, 295 of alternators A, B. Each alternator A, B then acts in tandem to increase the power available for the entire electrical system 200.

If the PWM drive signal to the respective field windings 292, 295 of each alternator A, B is intentionally interrupted asynchronously, then due to the reduced system capacity the error term between the target voltage and the sense voltage will increase resulting in PI controller 250 calculating a higher duty cycle for the PWM drive signal. The detection of this change confirms the contribution of the alternator A or B that has had the PWM drive signal to it its field windings interrupted and may be used as an input to diagnose a faulty alternator. The process may then be applied to the other alternator A, B in like fashion and thereby confirm the proper charging operation. In should be understood that if there are more than two alternators, this process can be applied equally to each of the alternators. In this regard, ECU 244 selects in turn the alternators to be evaluated and evaluates one of the alternators during each evaluation cycle. ECU 244 illustratively controls PWM enable 252 and PWM enable 254 to disable the PWM drive signal being applied to a respective field winding 292, 295.

Figure 3A:
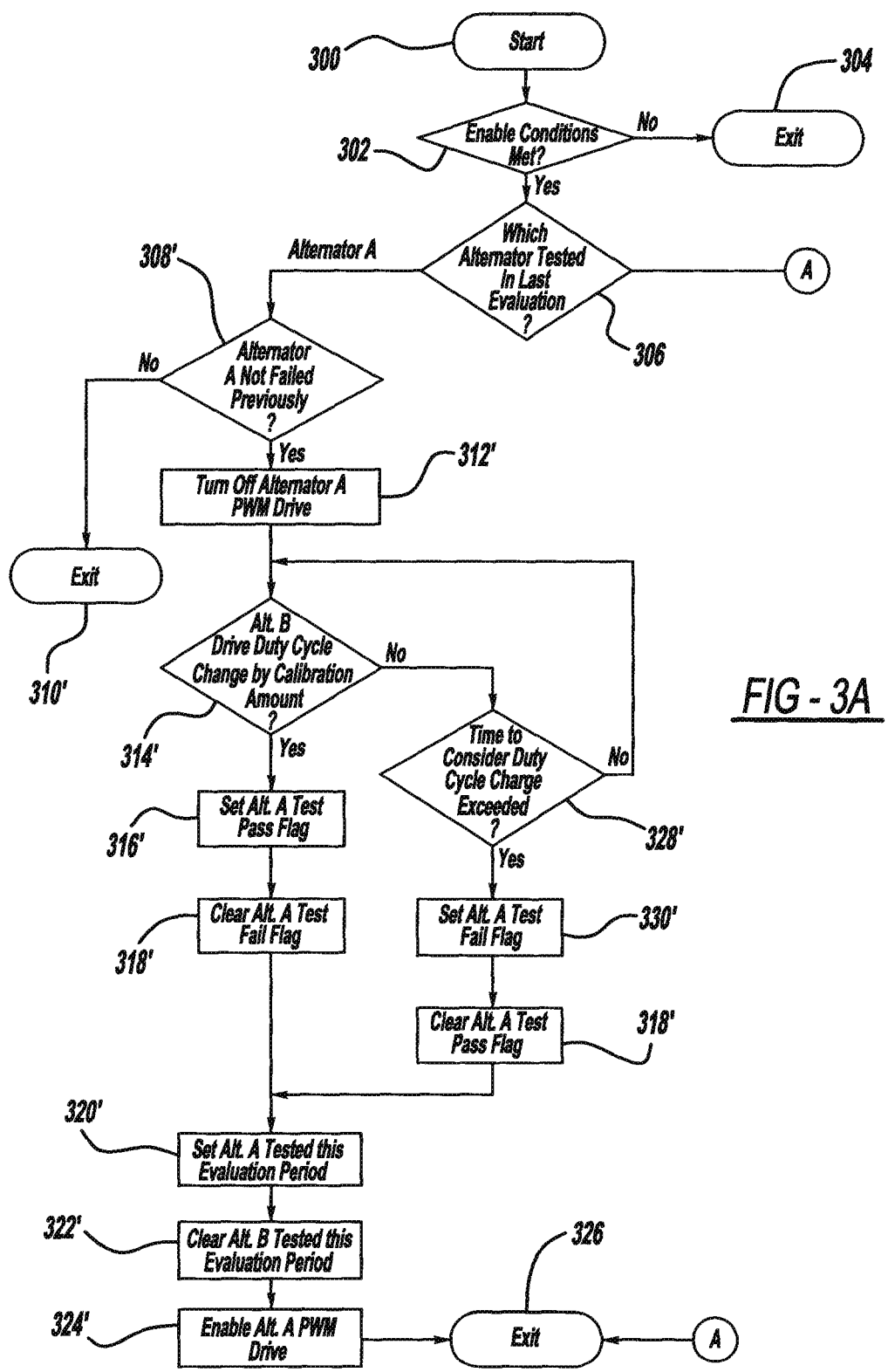
FIGS. 3A and 3B are a flow chart of an evaluation routine for evaluating for failure the electrical generating machines of the vehicle electrical system of FIG. 2.
Figure 3B:
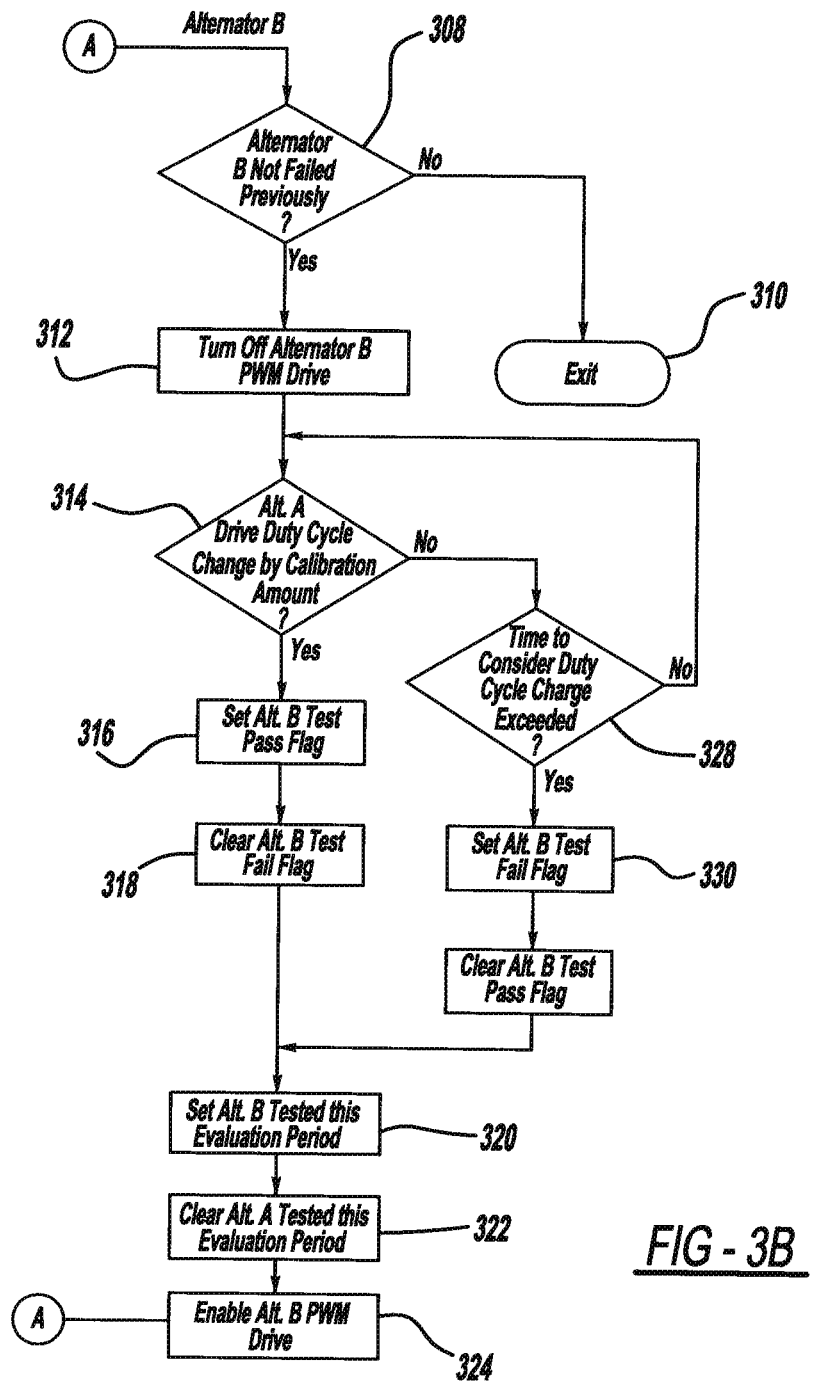

FIGS. 3A and 3B are a flow chart showing of illustrative program logic programmed into a controller for an evaluation routine that implements the foregoing method. This controller is illustratively ECU 244, but it should be understood that this controller could be another device, such as a stand-alone controller coupled to electronic voltage regulator 246, such as if electronic voltage regulator 246 was a separate device from the engine control module of vehicle 202.

The discussion of the following evaluation routine shown in the flow chart of FIGS. 3A and 3B focuses on an application with two alternators and is discussed with reference to electrical system 200 having alternators A, B. This evaluation routine may be simply expanded to evaluate any number of alternators.

ECU 244 starts the evaluation routine at 300 in FIG. 3A and at 302, determines if enabling conditions are met to proceed with evaluating the alternators A, B. The presence of certain conditions may prevent an accurate evaluation of the alternators and if any of these conditions are present, then the enabling conditions are not met. One such condition, by way of example, is when the calculated duty cycle for PWM drive signal is near its maximum. If the enabling conditions are not satisfied, ECU 244 exits the evaluation routine at 304. If the enabling conditions are satisfied, ECU 244 proceeds to 306 where it determines which of the alternators is to be evaluated. Illustratively, the alternators are evaluated sequentially, with one alternator being evaluated during each evaluation cycle. If at 306 ECU 244 determines that alternator A was evaluated during the last evaluation cycle, it selects alternator B for evaluation for this evaluation cycle and branches to 308. At 308, ECU 244 checks if alternator B had failed previously. If alternator B had failed previously (that is, an alternator B test fail flag has been set), ECU 244 exits the evaluation routine at 310. If alternator B had not failed in the last evaluation, at 312 ECU 244 disables the PWM drive signal to the field windings 295 of alternator B and proceeds to 314 where it checks if the duty cycle of the PWM drive signal calculated by PI controller 250 has increased by a predetermined amount. This predetermined amount is an amount that is sufficient to indicate that disabling alternator B has caused an appreciable drop in system output voltage and the electronic voltage regulator 246 is compensating for that drop by increasing the output of alternator A by increasing the duty cycle of the PWM drive signal applied to the field windings 292 of alternator A. It should be understood that this predetermined amount may be a calibratable amount and settable by setting the value for the appropriate calibration parameter in a calibration set programmed into ECU 244. It should be understood that this predetermined amount can be determined heuristically.

If the duty cycle calculated by PI controller 250 for the PWM drive signal has increased by the predetermined amount, there is a high probability that alternator B is working properly and ECU 244 then proceeds to 316 where ECU 244 sets an alternator B test pass flag and then proceeds to 318, where ECU 244 clears the alternator B test fail flag. ECU 244 then proceeds to 320 where it sets a flag that alternator B was tested during the present evaluation cycle and then at 322, clears a flag that alternator A was tested during the present evaluation cycle. ECU 244 then branches to 324 where it causes the PWM drive signal to field windings 295 of alternator B to be enabled, and at 326, exits the evaluation routine.

Returning to 314, if ECU 244 determines that the duty cycle calculated by PI controller 250 for the PWM drive signal did not increase the predetermined amount, it branches to 328 where it checks whether sufficient time has passed to allow electronic voltage regulator 246 to respond to a decrease in system voltage and increase the duty cycle of the PWM drive signal. If not, ECU 244 branches back to 314. If sufficient time has passed, there is a high probability that alternator B has failed and ECU branches to 330 where it sets the alternator B test fail flag and then at 332, clears the alternator B test pass flag. ECU then branches to 320. In this regard, the PWM drive signal to the field windings 295 of alternator B is re-enabled regardless of pass/fail status so that an intermittent failure does not completely shut down some contributions from alternator B.

It should be understood that in electrical system having more than two alternators, the duty cycle of the PWM drive signal applied to the field windings of any one (or all) of the alternators not being evaluated in the present evaluation cycle can be checked to determine if the alternator being evaluated in the present evaluation cycle has been failed.

The above described steps are mirrored for each of the other alternators in the electrical system. Again referring to electrical system 200 as an example and returning to 306, if ECU 244 selects alternator A for evaluation it mirrors the above steps which are identified with a corresponding reference with a "prime." For example, reference number 308' instead of 308. In this regard, it should be understood that there is an alternator test pass and an alternator test fail flag for each alternator in the electrical system. The PWM drive signal applied to the field windings of the alternator being evaluated is disabled to evaluate that alternator and the duty cycle calculated by P1 controller 250 for the PWM drive signal is checked to determine if the alternator being evaluated has failed.

Figure 4:
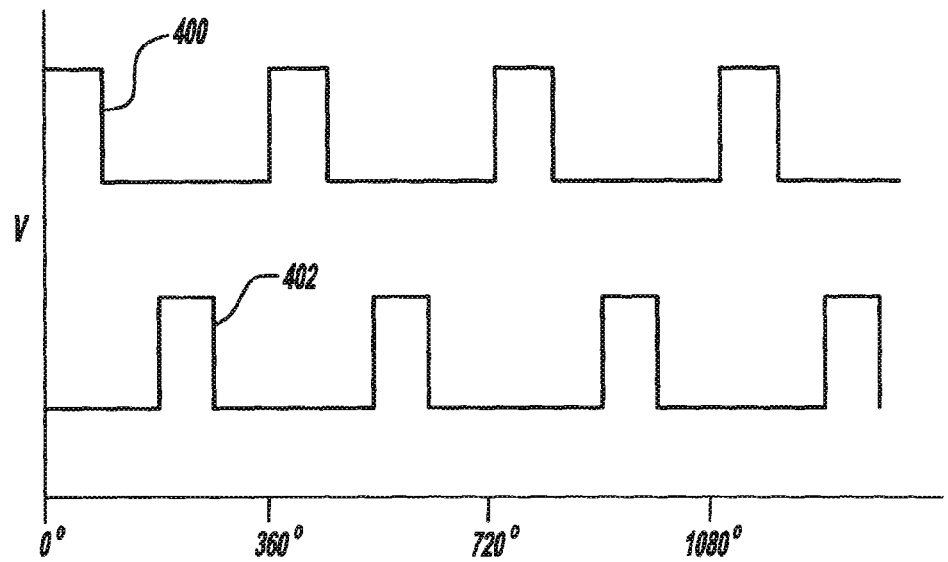
FIG. 4 is a graph showing pulse width modulated drive signals for two electrical generating machines that are out of phase with each other in accordance with an aspect of the present disclosure.

In accordance with another aspect of the present disclosure, ECU 244 causes the PWM drive signals applied to the field windings of the respective alternators to be out of phase with each other. More specifically, the phase relationship among the PWM drive signals is determined by 360/X where X is the number of alternators in the electrical system. For example, with reference to FIG. 4, in electrical system 200 which has two alternators, the PWM drive signals 400, 402 applied to the field windings 292, 295 of alternators A and B, respectively, are one-hundred and eighty degrees out of phase with each other, as shown in FIG. 4.

Figure 1:
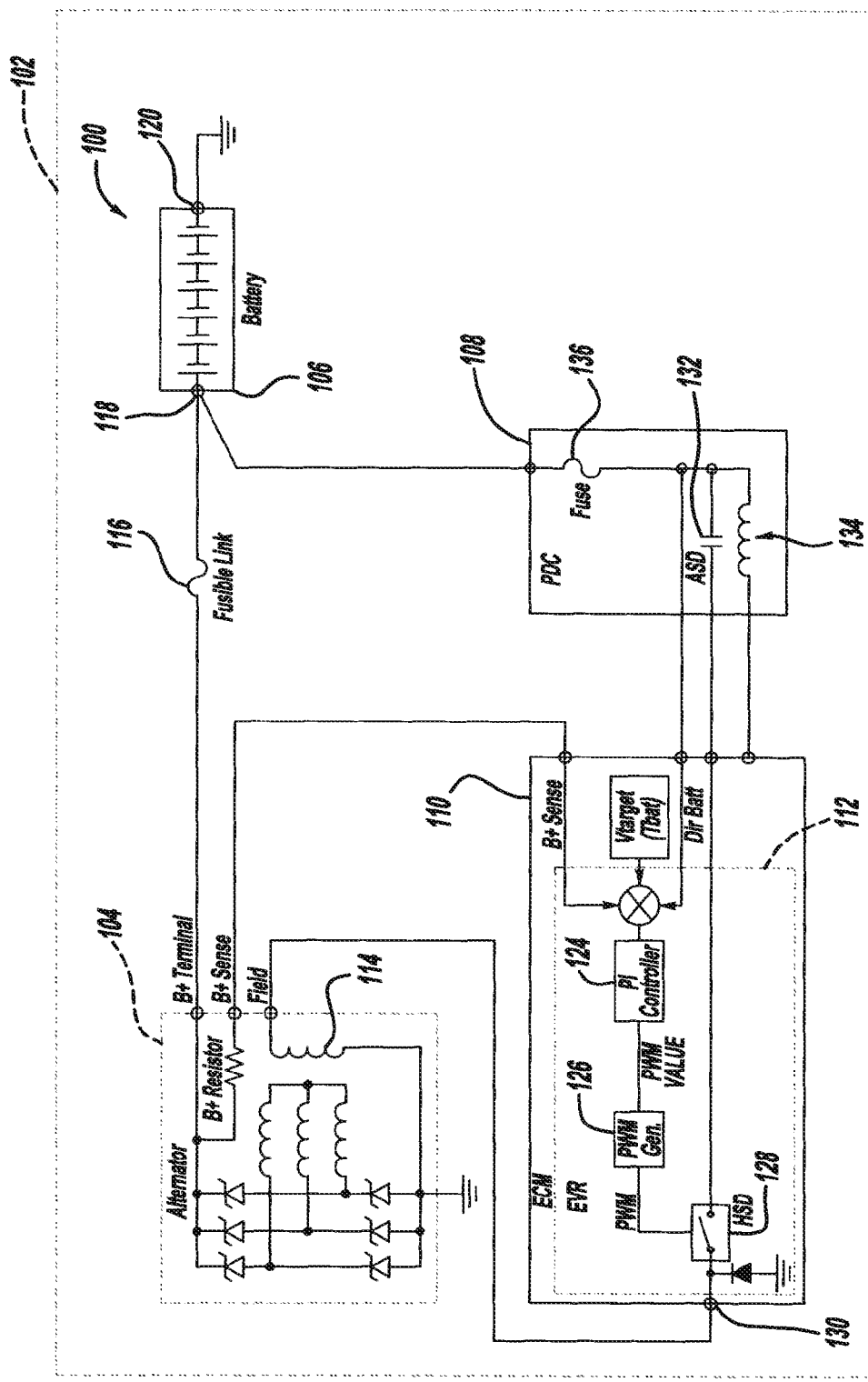
FIG. 1 is a simplified schematic of a prior art vehicle electrical system having an alternator and an external electronic voltage regulator.
Figure 5:
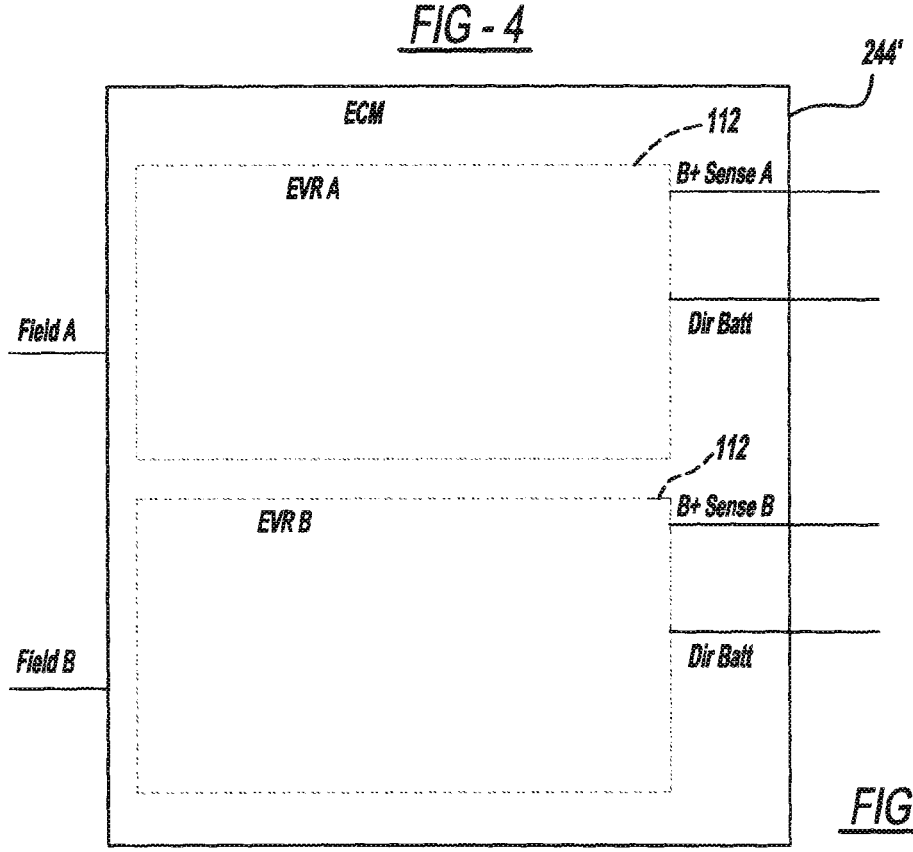
FIG. 5 is a simplified block diagram of a vehicle electrical system having multiple electrical generating machines each having field windings energized by pulse width modulated drive signals controlled by a respective external electronic voltage regulator in accordance with an aspect of the present disclosure.

While the preferred embodiment utilizes a single electronic voltage regulator (electronic voltage regulator 246) implemented in ECU 244, it should be understood that multiple electronic voltage regulators, one for each electrical generating machine, can also be utilized. FIG. 5 shows an embodiment in which two electronic voltage regulators 112 (FIG. 1) are implemented in an ECU 244' with each electronic voltage regulator 112 generating the PWM drive signal for a respective one of the respective field windings 292, 294 (FIG. 2) of the respective alternator A, B.

What is claimed is:

1. An electrical system for an automotive vehicle, comprising:
 a plurality of electrical generating machines with each electrical generating machine including field windings energized by pulse width modulated drive signals generated by an external electronic voltage regulator, the pulse width modulated drive signals having a duty cycle determined by the electronic voltage regulator, the electronic voltage regulator varying the duty cycle of each of the pulse width modulated drive signals to control output voltages of the electrical generating machines; and
 a controller that includes the electronic voltage regulator for each electrical generating machine, the controller causing the pulse width modulated drive signals that energize the field windings of any of the electrical generating machines to be out of phase with the pulse width modulated drive signals that energize the field windings of any other of the electrical generating machines.

2. The electrical system of claim 1 wherein the controller causes the pulse width modulated drive signals that energize the field windings of the electrical generating machines to have a phase relationship with each other determined by 360/X where X is the number of electrical generating machines that the electrical system has.

3. The electrical system of claim 1 wherein the electrical generating machines are alternators or generators.

4. The electrical system of claim 1 wherein the controller is an engine control module.

* * * * *